March 1, 1932. W. A. CHRYST 1,847,750
SHOCK ABSORBER
Filed Dec. 7, 1928 2 Sheets-Sheet 1
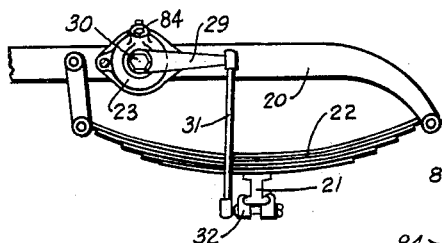
Fig. 1.
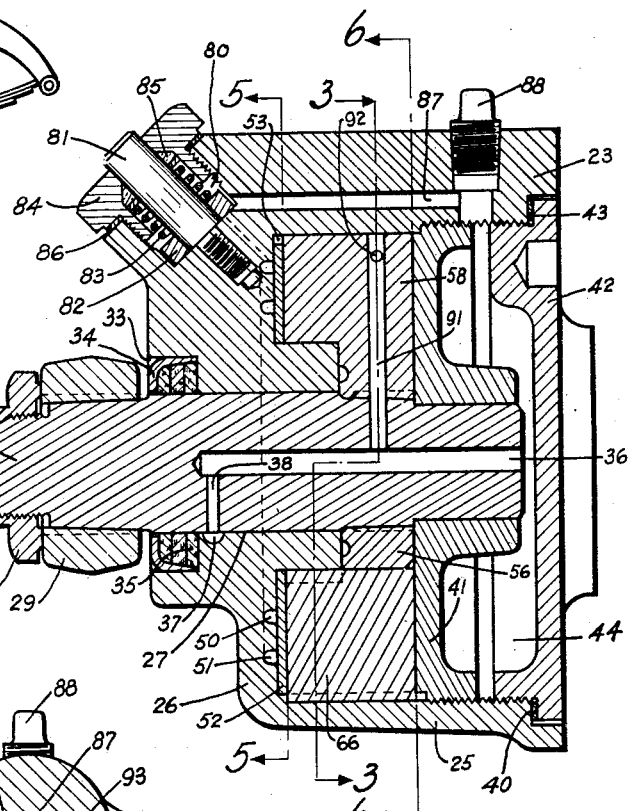
Fig. 4.
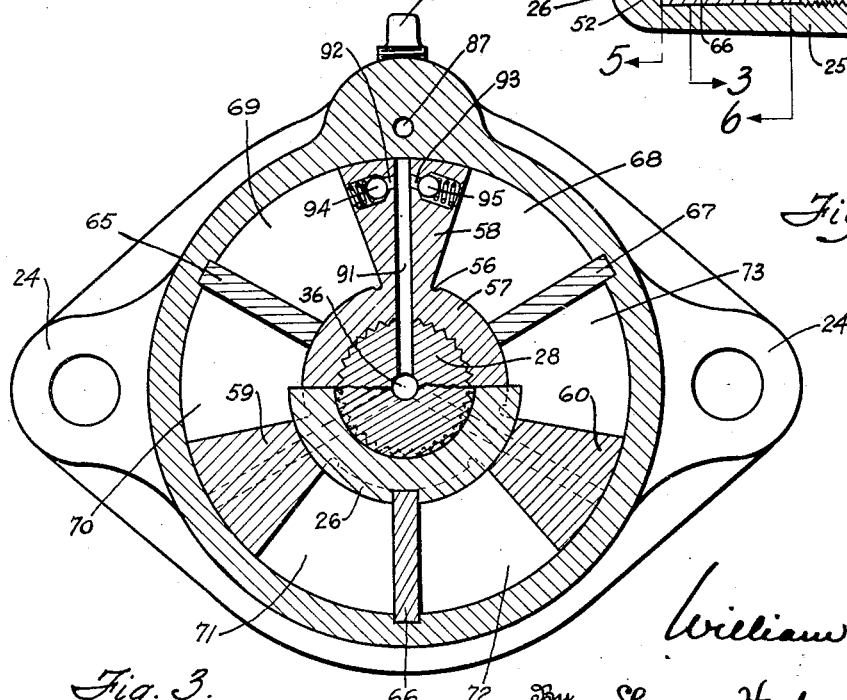
Fig. 2.
Fig. 3.
Inventor
William A. Chryst
By Spencer, Hardman & Fehr
Attorneys March 1, 1932.  W. A. CHRYST  1,847,750
SHOCK ABSORBER
Filed Dec. 7, 1928  2 Sheets-Sheet 2

Inventor
William A. Chryst
By Spencer, Hardman and Fehr
Attorneys

Patented Mar. 1, 1932

1,847,750

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed December 7, 1928. Serial No. 324,432.

This invention relates to improvements in shock absorbers particularly adapted to cushion the movements of two relatively movable members, for example, the frame and axle of a vehicle.

It is among the objects of the present invention to provide a shock absorber of simple and compact design, capable of resisting both the approaching and separating movements of the frame and axle of a vehicle whereby road shocks are dissipated before they can be transmitted to the frame of the vehicle.

Further objects and advantages of the present invention will be apparent from the following description, reference being had to the accompanying drawings, wherein a preferred form of the embodiment of the present invention is clearly shown.

In the drawings:

Fig. 1 illustrates a portion of the frame of an automotive vehicle, supported by springs upon the usual axle, the shock absorber, embodying the present invention being shown applied thereto.

Fig. 2 is a vertical, cross-sectional view taken through the center of the shock absorber.

Fig. 3 is a detail sectional view taken along the line 3—3 of Fig. 2.

Fig. 4 is a fragmentary sectional view of the pressure release device of the shock absorber.

Figure 5:
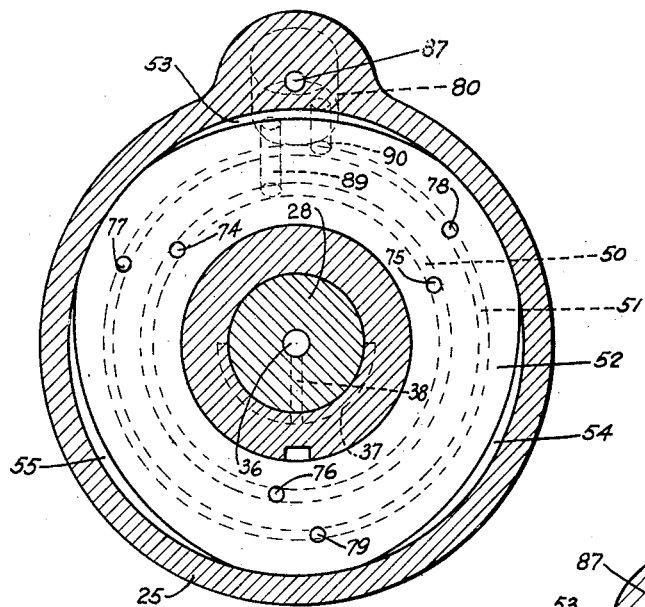
Fig. 5 is a detail sectional view taken along the line 5—5 of Fig. 2.

Referring to the drawings, the numeral 20 designates the frame of the vehicle supported on the axle 21 by springs 22, only one of which is shown.

The shock absorber comprises a casing 23 having apertured ears 24 for receiving bolts for securing the shock absorber to the vehicle frame. The casing is cup-shaped having a cylindrical wall 25 open at one end and closed at the other by the end wall 26. An opening 27 in the end wall 26, coaxial of the cylindrical wall 25, provides a bearing in which is journalled one portion of the operating shaft 28, one end of said shaft extending into the casing, the other end extending beyond the confines of end wall 26. To this latter end of the shaft 28 is secured one end of the shock absorber operating lever 29 a nut 30, screwed upon the end of the shaft 28, substantially preventing accidental removal of the lever from the shaft. The free end of lever 29 is swivelly secured to one end of the connecting link 31, the other end of said link being swivelly secured to the bracket 32 attached to the axle 21. A recess 33, provided in the outer surface of end wall 26 so as to be substantially concentric with the shaft 28, has a packing gland 34 fitting snugly therein, said gland tightly pressing packing elements 35 about the shaft 28 substantially to prevent fluid from leaking out of the bearing 27. A central passage or duct 36 extends from the inner end of shaft 28 throughout a portion of the length of said shaft. Fluid having a tendency to flow along bearing 27 is trapped within a groove 37 formed in the surface of the bearing 27, adjacent the inner end of recess 33, the fluid in said groove 37 being returned to the duct 36 through the cross passage 38 which connects the inner end of duct 36 with said groove as shown in Fig. 2.

The outer edge of the casing 23 is provided with a counter-bore presenting the shoulder 40. From this shoulder 40 the inner surface of the cylindrical wall 25 of the casing is provided with screw threads extending substantially halfway from the outer edge of said cylindrical wall to the inner surface of the end wall 26. This screw-threaded portion screw-threadedly receives the wall member 41 provided with a centrally apertured lug in which is journalled the inner end of the operating shaft 28. A cover-plate 42 is also screw-threadedly received by the cylindrical wall 25, said cover-plate having an annular flange which presses a gasket 43 against the shoulder 40 to provide a leak proof seal between the casing and cover plate. The relative positions of the wall member 41 and cover-plate 42 are such that a chamber or reservoir 44 is provided therebetween with which the duct 36 communicates. Another chamber is provided in the casing between the wall member 41 and the end wall 26 this chamber being referred to hereinafter as the "operating chamber."

Figure 6:
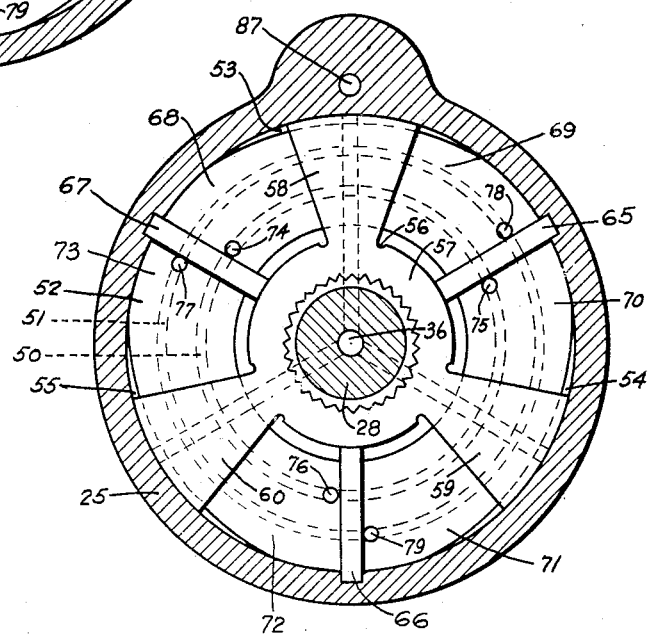
Fig. 6 is a sectional view taken along the line 6—6 of Fig. 2.

The inner surface of the end wall 26 has two concentrically arranged circular grooves 50 and 51 shown in dotted lines in the Figs. 5 and 6 and in section in Fig. 2. A ring-shaped lining plate 52 fits within said cup-shaped casing and particularly the "operating chamber" thereof, said plate engaging the inner surface of the end wall 26, and covering the grooves 50 and 51 so as to shut them off completely from the operating chamber. As shown in Figs. 5 and 6, lining plate 52 is not truly circular, but has spaced cut-away portions in its peripheral edge forming the gaps 53, 54 and 55 respectively between the said edge of the lining plate and the inner circular wall of the casing, said gaps being variable in width.

The portion of the operating shaft 28, extending through the operating chamber, has knurls formed thereon. Upon this knurled portion of the shaft is mounted the fluid displacement member 56 comprising a hub 57 having a series of equally spaced radial vanes 58, 59 and 60 the outer ends of which are arcuate and slidably engage the inner circular wall of the casing 23. One edge of the respective vanes slidably engages the lining plate 52, the other edge of the respective vanes engages the inner surface of the wall member 41, as shown in the Fig. 2. The shock absorber, when in its normal load position as shown in Fig. 1, will have the vanes 58, 59 and 60 of its fluid displacement member 56 so positioned within the casing that each vane will substantially bisect its respective gap 53, 54 and 55 or more specifically as shown in Fig. 6, equal portions of the respective gaps will be uncovered on each side of the respective vanes.

The vanes 58, 59 and 60 divide the operating chamber of the casing into three sections of equal volume the section on one side of a vane being in communication with the section on the other side of the said vane by a respective gap 53, 54 or 55. Each of these sections are sub-divided into compartments by the provision of partitions 65, 66 and 67 the compartments being numbered 68, 69, 70, 71, 72 and 73 respectively. The various partitions are supported within grooves provided in the annular walls of the casing, the wall member 41 being screwed into the casing until the inner surface thereof engages the outer edge of the partitions and forces them into pressing engagement with the lining plate 52. The inner edges of the various partitions are arcuated to fit snugly and slidably upon the outer surface of the hub 57 of the fluid displacement member. From the aforegoing it may be seen that each vane 58, 59, and 60 is now provided with a compartment on each side thereof, one compartment acting as a compression compartment and the other as a suction or loading compartment when the vane is being oscillated in one direction, the function of said compartments reversing upon reversal of the movement of the vane. Gaps 53, 54 and 55 provide communication between compartments 68—69, and 70—71, and 72—73 respectively as shown in Fig. 6.

Compartments 68, 70 and 72 are in communication with the circular groove 50 through holes or ducts 74, 75 and 76 respectively, provided in the lining plate 52. These ducts 74, 75 and 76 are located adjacent the side of partitions 67, 65 and 66 forming one wall of the compartments 68—70 and 72 respectively. Adjacent the opposite sides of partitions 67, 65 and 66 lining plate 52 has holes or ducts 77, 78 and 79 respectively which connect compartments 73, 69 and 71 respectively with the circular groove 51.

Referring particularly to the Fig. 2, casing 23 has a recess 80 for receiving the pressure release device, which comprises a pin 81, screw threaded into the casing coaxially of the recess 80. A ring-shaped valve 82 is slidably supported upon pin 81 and is yieldably urged against the bottom wall of said recess by a spring 83 pressed toward said valve by the recessed nut 84 through which the pin 81 extends. A packing 85 within the nut 84 and a gasket 86 between the nut and casing substantially prevent fluid leaks. Casing 23 has a duct or passage 87 leading from the recess 80 to the fluid reservoir chamber 41. A screw plug 88 in an opening in the casing leading from the said reservoir chamber 41 to the outside of the casing, may be removed to drain or add fluid to said casing. Two passages 89 and 90 lead from the circular grooves 50 and 51 respectively, said passages terminating in the bottom surface of the recess 80 and being held normally closed against communication with each other and with the duct or passage 87 by the yieldable valve 82. These passages are clearly illustrated in the Figs. 4 and 5.

As shown in the Figs. 2 and 3, vane 58 of the fluid displacement member 56 has a duct or passage 91 which coincides with a passage in the shaft 28 and thus communicates with the duct or passage 36. Adjacent the outer end of the vane 58 are two cross passages 92 and 93 connecting with passage 91, passage 92 leading into compartment 69 and passage 93 leading into compartment 68. Each cross passage has a valve-seat, a check-valve 94 being yieldably maintained against the valve-seat of passage 92 and a similar check-valve 95 is yieldably maintained against the valve-seat of passage 93.

*Mode of operation*

When an obstruction in the roadway is met by the wheels of the vehicle, the axle 21 will be forced upwardly toward the frame 20, flexing the spring 22. This movement of axle 21 causes the link 31 and the shock absorber operating arm 29 to rotate the operating shaft 28 in a counter-clock-wise direction as regards Figs. 1 and 3, clockwise as regards Figs. 5 and 6. Compartments 69, 71 and 73 of the shock absorber, which may be termed the "bumper" chambers, will have pressure exerted upon the fluid therein by the respective vanes 58, 59 and 60. The check valve 94 of the vane 58 will be forced against its seat to close passage 92 while on the other hand this movement of the vane 58 will cause the fluid within the duct 91 to push the check valve 95 from its seat, establishing a flow of fluid from the reservoir 44 through the passages 36, 91 and 93 past the valve 95 into the compartment 68 now acting as a suction compartment. The vane 58, exerting pressure upon the fluid within the "bumper" compartment 69, will force the fluid from said compartment through the gap 53, into the "snubber" compartment 68 on the opposite side of vane 58. This fluid flow will gradually be restricted inasmuch as the vane 58 is moving from the wider portion of the gap 53 toward the smaller end thereof, thus the movement of the vane 58 toward the partition 65 will gradually be resisted. The same is true of the vanes 59 and 60. Vane 59 exerting pressure upon the fluid in bumper chamber 71 will force said fluid to flow through gap 54, the flow of fluid through said gap being gradually restricted as the vane 59 approaches partition 66. Vane 60 approaching partition 67 will cause the fluid from "bumper" compartment 73 to flow through the gap 55 and this flow, like the aforementioned, will gradually be restricted as said vane approaches said partition 67. The restriction of the flow of fluid from these various "bumper" compartments will resist the rotation of the fluid displacement member, causing a consequent resistance to the upward movement of the axle 21 and to the flexing of spring 22.

If the obstruction encountered by the road wheels of the vehicle is comparatively large, causing the axle 21 to be moved upwardly with sufficient force to move the fluid displacement member so that it will cause undue or excessive pressure to be exerted upon the fluid within the various "bumper" chambers 69, 71 and 73 respectively, which pressure cannot be relieved by the fluid flow through the various gaps 53, 54 and 55 respectively, fluid will be forced through the ducts 78, 79 and 77 from compartments 69, 71 and 73 respectively, into the circular groove 51 and passage 90, against valve 82 of the pressure release device, said valve, after being lifted, establishing a flow from the passage 90 through the passage 87 into the reservoir 44. In this way any excessive pressures within the "bumper" chambers 69, 71 and 73 will be relieved, thus tending to avoid breakage due to such excessive high pressures.

As soon as spring 22 has reached the limit of its flexing movement, caused by the striking of the obstruction, it will have a tendency to return toward its normal unflexed position with a sudden, rebounding movement, which results in a sudden jar being transmitted to the frame of the vehicle. The present device is so constructed that it prevents such sudden return of the springs.

Referring to Fig. 6, after the spring 22 has been moved into flexed position, the vanes 58, 59 and 60 will be in a position adjacent their respective partitions 65, 66 and 67 in which position the "bumper" compartments are greatly reduced in volume, the "snubber" compartments 68, 70 and 72 being increased in volume. In these positions the vanes are positioned substantially over one end of the respective gaps 53, 54 and 55. Now, as the spring 22 starts to move toward its normal unflexed position, the connections 31 and 29 will move the operating shaft 28 in a clockwise direction as regards Figs. 1 and 3, counter-clockwise as regards Fig. 6, thus pressure will be exerted by the vanes 58, 59 and 60 upon the fluid within compartments 68, 70 and 72. This pressure upon the fluid will cause it to flow from the said compartments through the ducts 53, 54 and 55 respectively. In moving from the positions, which the vanes occupy when the spring 22 is in the flexed position, to their intermediate normal position as shown in Fig. 6, the flow of fluid through the various gaps will be gradually, decreasingly restricted inasmuch as each vane is moving from the smaller toward the larger portion of its respective gap. Thus from said initial position until the intermediate normal position is reached the movement of the fluid displacement member will gradually, decreasingly be resisted, and likewise as the spring 22 moves from its flexed toward the normal position, it also will gradually, decreasingly be resisted. However, when the spring moves beyond its normal position, causing the fluid displacement member 56 to move its vanes 58, 59 and 60 beyond their normal intermediate position as shown in Figs. 3 and 6, the fluid flow through the gaps 53, 54 and 55 will gradually, increasingly be restricted inasmuch as the vanes are now moving from the larger portions toward the smaller ends of the gaps, thus this latter movement of the fluid displacement member and likewise the latter unflexing movement of the spring 22, will gradually, increasingly be resisted.

Undue pressures in the "snubber" compartments 68, 70 and 72 will force fluid to flow through ducts or passages 74, 75 and 76 respectively into the circular groove 50, through passage 89 communicating with said groove, against pressure release valve 82, moving it from its seat to establish connection with the passage 87 which empties into the reservoir 44.

When either of the check valves 94 or 95 act as loading valves for their respective compartments 69 and 68, said compartments, being in constant communication with their corresponding "bumper" and "snubber" compartments respectively, will provide these corresponding compartments with a fluid supply.

Applicant's device is a compact and sturdy structure providing three vanes for distributing fluid pressure over a large area and thus substantially reducing wear and eliminating possible breakage. The operating parts of the shock absorber, particularly the operating shaft and the fluid displacement member, though made comparatively large, still present a small and compact structure capable of cushioning movements of the axle and frame of a vehicle.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing containing a fluid; a vane in said casing dividing it into two compartments, and movable in either direction to exert pressure upon the fluid in one compartment and to draw fluid into the other; a fluid leak passage connecting the two compartments and adapted to establish a restricted flow of fluid from the compartment having pressure upon the fluid therein into the other compartment, said fluid flow being restricted in accordance with the position of the vane; and passages leading from the said compartments to a common pressure release device, which is independent of the vane, said device being adapted to establish an additional flow of fluid from either compartment when the pressure therein cannot properly be released by the flow of fluid through said leak passage.

2. A shock absorber comprising, in combination, a casing containing a fluid; a vane oscillatably supported within the casing and dividing it into compartments of variable volume; a lining plate within said casing; a recess in said lining plate providing communication between the compartments and adapted to establish a restricted flow of fluid from one compartment to the other in response to oscillations of the vane; and a common relief valve adapted to establish a flow of fluid from either one of said compartments when the recess in the lining plate is unable to conduct sufficient fluid from said compartments to relieve the pressure therein.

3. A shock absorber comprising, in combination, a casing containing a fluid; a vane oscillatably supported within the casing and dividing it into compartments of variable volume; a lining plate within said casing; a recess of variable width provided by said lining plate, said recess connecting the compartments and being adapted to establish a flow of fluid from one compartment to the other, variably restricted in response to the movement and in accordance with the position of the oscillatable vane; a common pressure release device; and ducts leading from the several compartments to the said device whereby to establish an additional flow of fluid from either one of said compartments when the pressure therein cannot be relieved by the recess in the lining plate.

4. A shock absorber comprising, in combination, a casing containing a fluid; a plurality of fixed partitions radially arranged within said casing in spaced relation; a fluid displacement member oscillatably supported within the casing, said member having a plurality of radial vanes so arranged that each vane divides a space between adjacent partitions into two compartments respectively; a port in the casing communicating with all of the compartments; and a common pressure release device in said port adapted to control the fluid flow from all of said compartments.

5. A shock absorber comprising, in combination, a casing containing a fluid; a plurality of fixed partitions radially arranged within said casing in spaced relation; a fluid displacement member oscillatably supported within the casing, said member having a plurality of radial vanes so arranged that each vane divides a space between adjacent partitions into two compartments respectively; a separate passage connecting each of said two compartments and adapted, in response and under the control of the respective vane, to establish a restricted flow of fluid from one of said compartments to the other; and a common pressure release device for all of said compartments independent of the vane, and adapted to establish an additional flow of fluid from said compartments in response to pressure therein exceeding a predetermined valve.

6. A shock absorber comprising, in combination, a casing having two chambers containing a fluid; a plurality of fixed partitions radially arranged in spaced relation within one of said chambers; a fluid displacement member oscillatably supported within said one chamber, and having vanes radially arranged so that each respective vane divides a space between adjacent partitions into two compartments; ducts connecting each compartment with the other chamber of the casing; and a common pressure release device supported in a recess in the casing and adapted to control the flow of fluid through said ducts in accordance with the pressure within said compartments.

7. A shock absorber comprising, in combination, a casing having two chambers containing a fluid; a plurality of fixed partitions radially arranged in spaced relation within one of said chambers; a fluid displacement member oscillatably supported within said one chamber, and having vanes radially arranged so that each respective vane divides a space between adjacent partitions into two compartments; fluid charging ducts leading from the other chamber of the casing through one of the vanes into the compartments on each side of said vane; check valves for controlling the flow of fluid through said ducts whereby a fluid is adapted to be introduced into the compartment the volume of which is being increased by the movement of said vane; a pressure release device; a duct leading from said other chamber of the casing to the pressure release device; separate sets of intercommunicating ducts leading from the corresponding chambers on each side of the respective vanes to the pressure release device, said two sets of intercommunicating ducts being normally shut off from communication with each other and with the duct leading to the other chamber of the casing by the pressure release device, said device, however, being adapted to establish communication between said chamber and the set of ducts leading from the respective compartments in which pressure is being exerted upon the fluid, the other set of ducts being adapted to convey fluid to the respective compartments from the corresponding compartment adjacent the vane provided with the charging ducts having sub-atmospheric pressure.

8. A shock absorber comprising, in combination, a casing containing a fluid, spaced grooves in said casing; a lining member within said casing covering said grooves; a vane oscillatably supported within the casing and dividing said casing into compartments of variable volume; a pressure release device; separate ducts leading from the respective grooves to the said pressure release device, communication between said ducts normally being cut off by said device; ducts in the lining member, one of which connects one compartment with the one groove the other connecting the other compartment with the other groove.

9. A shock absorber comprising, in combination, a casing containing a fluid; a vane oscillatably supported within the casing, dividing it into two compartments of variable volume; grooves in said casing; a lining plate covering said grooves; a duct provided by said plate connecting the compartment on one side of the vane with the compartment on the other side thereof, said duct being adapted to establish a flow of fluid from the one compartment acting as a compression chamber into the other compartment acting as a suction chamber; a spring loaded, pressure relief valve having two normally closed passages one of which communicates with one of the grooves of the casing the other with the other of said grooves; and apertures in the lining member one of which connects the one groove with the one compartment, the other aperture connecting the other groove with the other compartment.

10. A shock absorber comprising, in combination, a cylindrical casing containing a fluid; circular grooves in said casing; a plurality of fixed partitions, radially arranged within said casing in spaced relation; a fluid displacement member oscillatably supported within the casing, having a plurality of radial vanes so arranged that each vane divides a space between adjacent partitions into two compartments respectively; a spring loaded pressure relief valve in the casing; separate ducts leading from the respective circular grooves to the said valve and normally, yieldably closed thereby; a lining plate within the casing, interposed between the fluid displacement member and the wall having the circular grooves so that said grooves are covered by said plate, the plate providing ducts of variable width between each two compartments separated by a vane, said ducts being adapted to establish a restricted flow of fluid from one of the respective compartments into the other in response to pressure in the one compartment as the respective vane of the fluid displacement member moves toward the partition forming said pressure compartment, said lining plate providing ducts connecting one circular groove of the casing with compartments correspondingly formed on the one side of the several vanes and ducts connecting the other circular groove with the compartments correspondingly formed on the other side of the several vanes.

11. A shock absorber comprising, in combination, a cylindrical, cup-shaped casing; a shaft rotatably supported by the casing, coaxially thereof, and extending into said casing; a cover plate for the casing; a wall in said casing dividing it into two chambers said wall having one end of the rotatable shaft journalled therein; a plurality of fixed partitions radially arranged in spaced relation within the one chamber; a fluid displacement member supported by the rotatable shaft, said member having vanes radially arranged so that each respective vane divides a space between adjacent partitions into two compartments; ducts in the shaft and one of the vanes connecting the reservoir chamber, between the wall and cover plate of the casing, with the compartments provided by said one vane; check valves in said ducts whereby fluid may flow only into that compartment whose volume is being increased by the movement of the vane; a pressure relief valve; a duct leading from the reservoir chamber to one side of said relief valve; circular, spaced grooves in the chamber of the casing containing the fluid displacement member; a lining plate covering said grooves; ducts in said lining plate providing communication between the two compartments of the respective vanes; ducts connecting corresponding compartments on the one side of the respective vanes with one of the circular grooves; ducts connecting corresponding compartments on the other side of the respective vanes with the other of said grooves; and ducts leading from said grooves to the side of the pressure relief valve opposite the duct leading to the reservoir chamber, said ducts being normally closed by said valve.

In testimony whereof I hereto affix my signature.

WILLIAM A. CHRYST.